United States Patent Office 3,708,301
Patented Jan. 2, 1973

3,708,301
AZO COUPLERS OF THE CYANOACETYLATED POLYAMINE CLASS
Peter Muller, Port Washington, N.Y., assignor to Andrews Paper & Chemical Co., Inc., Port Washington, N.Y.
No Drawing. Continuation-in-part of abandoned application Ser. No. 805,003, Mar. 6, 1969. This application Nov. 24, 1969, Ser. No. 879,553
Int. Cl. G03c 1/58
U.S. Cl. 96—91 R
2 Claims

ABSTRACT OF THE DISCLOSURE

Cyanoacetylated polyamines as a new class of azo couplers, useful in the diazotype reproduction process as coupling components for diazotype reproduction materials. The cyanoacetylated polyamines are substantially non-volatile, non-migratory and exhibit excellent stability.

CROSS-REFERENCE TO RELATED APPLICATION

This is a continuation-in-part application S.N. 805,003, filed on Mar. 6, 1969 now abandoned.

BACKGROUND OF THE INVENTION

The diazotype reproduction process due to its simplicity of use, efficiency and economy has found wide application and acceptance in the copying industry. The process is based on the sensitivity of the diazo compounds to the short wave length portion of the visible spectrum and to ultraviolet light and also on the capacity of diazo compounds to react with certain compounds generally called couplers to form azo dyes under controlled pH conditions.

Various print colors, for example, blue, yellow, sepia, red and black, may be obtained by the proper selection of the diazonium compounds with one or more appropriate azo couplers. It has been found that the azo coupler influences the color shade to a greater extent than the diazonium compound. Therefore, the proper selection of the azo coupler is important where a particular color shade is desired.

Diazotype light sensitive materials are available in two general forms.

(1) The two component or dry system employs diazo and coupling compounds coated on a backing sheet. The coated sheet is exposed to actinic light behind the master which is to be reproduced and thereafter the irradiated diazotype sheet is exposed to aqueous ammonia vapor which induces the development of the azo dye in the areas which have not been exposed to the radiation.

(2) The single component or semi-moist system employs a backing sensitized with a diazo coating containing no coupling compound. The sensitized sheet is exposed to actinic light behand a master; thereafter the diazo reproduction sheet is moistened with an aqueous solution containing a dye forming coupler and other compounds thereby inducing the development of an azo dye from one or more of the residual diazo compounds which have not been decomposed by light.

Generally, blueline and blackline diazotype prints are the most commonly used, with redline being used to a limited extent. Sepia and yellow line diazotypes are generally used for intermediate prints because of their excellent opacity to actinic radiation. To produce blackline diazo prints, couplers for yellow azo dyes are mixed or combined with couplers for blue azo dyes and in some instances couplers for sepia azo dyes are included. Therefore, to produce a blackline diazo reproduction sheet at least two types of couplers to produce dyes of complementary colors are employed in the sensitizing layer; a blue azo dye and a yellow azo dye. The choice of couplers is important particularly with regard to their respective rates of coupling with the diazonium compounds in the sensitized layer. If the rates of coupling differ then the print shades will differ from shades of full tones to shades of intermediate tones; for example, the azo dye formed by the coupler with the greater coupling rate will predominate in the intermediate tones and thus the desired color balance is upset. The choice of coupler pairs presents a greater problem with the availability of a variety of specialized developing equipment where the speed of processing and economics are controlling elements of design. Conventional diazotype papers generally employ diazonium compounds of the p-phenylene-diamine diazonium class. For high speed diazo printing, the diazonium compounds employed are generally the 2,5-dialkoxy - 4 - morpholino-benzene diazonium compounds. However, this class of compounds tends to develop reddish shades which are difficult to compensate because of the limitation of available or known azo couplers.

Yellow couplers heretofore known have been used but with limited success. The N-aryl or N-aralkyl or N-alkyl substituted acetoacet amides of sufficient solubility in acidulated systems can be employed as yellow couplers for blackline diazotype reproduction materials only in very low concentrations due to their tendency to precouple with the diazonium compound in the sensitized layer. Another inhibiting factor for their application is the fact that many of these compounds are highly volatile and tend to evaporate from the sheet. Further, the acetoacet derivatives are not desirable since there are no blue couplers available with similar coupling rates to balance the coupling reaction and undesirable bi-tonal effects result. Where the acetoacet derivatives are employed, the shelf life of the sensitized paper is short due to the premature precoupling with the diazonium compound in the sensitized layer which results in a yellow print background. If precoupling does not occur, but the acetoacet derivatives volatilize, the print color shifts from grayish to blue tones. Many of them also tend to migrate from the diazo sensitized layer into the base sheet and blue shades prevail in the print color. All these effects are undesirable and make the couplers unattractive for use in the diazotype process.

Resorcinol, although recognized as an excellent azo coupler, is undesirable since it develops a brownish dye which becomes more yellow when the pH is adjusted after dissipation of the ammonia vapors from the development process of the diazo print. Resorcinol can be used to obtain blackline diazo prints; however, during storage of such reproduction materials the resorcinol has a tendency to migrate from the sensitized diazo layer into the base sheet and therefore is then not available during the coupling reaction in the development process.

Another well known yellow coupler, m-hydroxyphenyl-urea, exhibits excellent stability over long periods of storage, but does not readily react or couple with the diazonium compound in the sensitized layer. Since this class of yellow couplers reacts with the diazonium compounds at considerably slower rates than the useful blue-line couplers, the developed print will have predominant blue shades rather than shades of black and gray. If such blue couplers were employed with the same reaction rate as m-hydroxyphenylurea couplers, the developing rate would be too slow and would make such diazotype paper unattractive for commercial application.

Still another type of yellow couplers which have been employed for blackline diazo prints are the cyanoacetamides. These yellow couplers have coupling speeds which range somewhere between the acetoacetamides and the hydroxyphenylurea couplers. Black shades with good developing characteristics can be obtained when the sensitized layer contains blue couplers and the cyano-acetamide type couplers. However, the cyanoacetamide couplers are highly volatile and are easily evaporated from the diazonium sheet during the drying process for making diazo reproduction materials. These couplers also tend to migrate into the base sheet and particularly in the presence of the necessary residual moisture in the sheet which is required for speedy development of the diazo print. Some of the known derivatives of these couplers do not migrate, but they are too insoluble in aqueous systems for practical use.

SUMMARY OF THE INVENTION

The invention generally contemplates providing cyanoacetylated polyamines as a new class of azo couplers, useful in the diazotype reproduction process as coupling components. The cyanoacetylated polyamines are substantially non-volatile, non-migratory and exhibit excellent stability.

It has been found that the cyanoacetopolyamine derivatives are useful as azo couplers and particularly when used as a component of the diazo sensitized layer for diazo reproduction materials. These derivatives have the following general formulas:

(1)
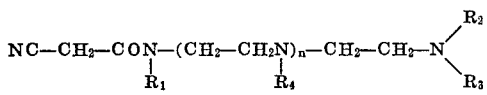

and (2)
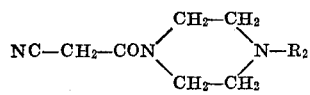

their salts and mixtures thereof;

Where $n$ is at least 1; $R_1$ is hydrogen, alkyl, aryl, aralkyl and hydroxyalkyl; $R_2$, $R_3$ are hydrogen, cyanoacet, cyanoacet-aminoethyl, alkyl, hydroxyalkyl, polyhydroxyalkyl, alkoxyalkyl, acylaminoalkyl, morpholinoalkyl, acyl, aroyl, with or without substitution in the nucleus and $R_4$ is hydrogen, cyanoacet, alkyl, acyl and aroyl.

The products of Formulas 1 and 2 are excellent yellow couplers of medium coupling activity as many commercially available blue couplers are of relatively low volatility and are heat stable under practically all of the conditions to which diazo reproduction materials are subjected during their production and subsequent use. Also, the products of Formulas 1 and 2 do not tend to migrate from the sensitized diazo layer into the diazo base sheet during storage and do not tend to precouple with the diazonium compounds even in the presence of relatively high residual moisture in the diazotype material. It has been found that when the products of Formulas 1 and 2 are incorporated with commercially available blue azo couplers of similar coupling rates, improved blackline diazo reproduction materials are formed which have excellent shelf life, do not precouple, and in which the dye forming components do not migrate into the base sheet. The resulting reproduction exhibits blackline copies having very close to neutral black and gray shades regardless of the type of commercially available developing equipment.

Another advantage of these couplers is their usefulness in the manufacture of superfast printing blackline diazotype materials. These materials produce prints of excellent quality by ammonia development in hot development as well as in cold development machines. The latter machines are frequently used for office copying purposes or by architects. Commercially available superfast printing blackline diazotypes do not develop to identical shades under hot as well as under cold development conditions. Hot development conditions may produce prints of blue shades and cold conditions may produce brownish to black shades, or vice versa. The variation of shade colors is due to the unbalanced reaction of the coupler pairs with the diazonium component. Coupler compositions of yellow couplers of the class of this invention with various commercially available blue couplers overcome this difficulty and generate uniform shades under the cited different development conditions.

It is believed that the polyamine structure of these azo couplers covered by the invention continues to exist in the azo dyes made from these couplers, and the polyamine character gives such azo dyes special affinity to substrates, particular solubility characteristics and makes the dyes apt to cross linking reactions. In short, this new class of couplers opens a wide range of new applications for azo dyes even in fields other than the diazotype industry.

DESCRIPTION OF THE PREFERRED EMBODIMENT

It has been found that an improved diazo sensitive composition may be made with the products of Formulas 1 and 2 and that these couplers are generally readily soluble in acidulated water and are compatible with practically all diazo sensitizing solutions. Also some derivatives of the products of Formulas 1 and 2 form complex or double salts with metal salts.

The couplers of Formulas 1 and 2 are easily prepared by directly reacting the corresponding amines, for example, triethylene tetramine, diethylene triamine, etc. with the cyanoacetic esters, such as cyanoacetic methyl ester, cyanoacetic ethyl ester. Equivalent ratios of the esters and amines are reacted in a solvent, e.g., methyl alcohol; the reaction is spontaneous and the product crystallizes from the solution in good yield. These esters and amines are commercially available at low cost.

Some of the cyanoacet-polyamines of Formulas 1 and 2 are, for example, $N^I,N^{III}$-dicyanoacet-diethylene-triamine, hydrochloride; $N^I,N^V$-dicyanoacet-tetraethylenepentamine, hydrochloride; 1 - cyanoacet-4-beta-hydroxyethyl-piperazine; $N^I,N^{IV}$ - dicyanoacet - triethylenetetramine, hydrochloride; 1 - cyanoacet - 4 - cyanoacetaminoethyl-piperazine.

A typical blackline diazo sensitizing composition of this invention will contain at least two couplers, one of which is a blue azo coupler and the other is an azo coupler of either Formula 1 or 2. Also mixtures of the couplers of Formulas 1 and 2 as well as mixtures of blue couplers may be employed. The sensitizing composition also contains diazonium compounds, stabilizers, buffers, etc. generally contained in sensitizing formulations.

It has been found that when employing the sensitizing compositions of the invention as the diazotype layer for blackline diazotype reproduction materials, the product formed thereby may be processed in any of the commercially available diazo reproduction apparatus including the high or low speed diazo printing and development processors which may employ hot or cold ammonia. Improved diazotype blackline copies are obtained having close to neutral black and gray shades.

The following examples illustrate the application of several of the yellow couplers of this invention formed by products of Formulas 1 and 2 as a component of a sensitized diazo composition.

EXAMPLE 1

On a reproduction paper coating machine equipped with two front and one back coating station, each consisting of an applicator roller and an air knife and a convection hot air high velocity dryer after each coating station, a direct process base paper of 20 pound substance weight is coated on the felt side in the first coating station with a precoat preparation of the following composition:

| | |
|---|---|
| Water ml | 1,000 |
| Silica (with average particle size of 1 micron) g | 40 |
| Aluminum hydroxide (of a particle size below 1 micron) g | 60 |
| Casein g | 14 |
| Sodium borate g | 1 |
| Ammonia, conc. g | 2 |
| Dispersion of polyvinylacetate (40% solids) cc | 25 |

The paper is passed through the first dryer and then enters the second coating station where a diazotype layer from the following solution is applied over the dried precoat layer:

| | |
|---|---|
| Water ml | 1,000 |
| Sulfosalicylic acid g | 10 |
| Citric acid g | 10 |
| Caffeine g | 20 |
| Beta-hydroxy-naphthoic acid - morpholinopropylamide g | 5 |
| $N^I,N^{IV}$-dicyanoacet-triethylene - tetramine, hydrochloride g | 18 |
| 1 - diazo-2,5-diethoxy-4-morpholino-benzene, chloride ½ zinc chloride g | 12 |
| Glycerine ml | 20 |
| Saponine g | 1 |
| Zinc chloride g | 40 |

The coated paper passes the second dryer and afterwards obtains a backcoating of water for curl control in the third coating station before it passes through the final dryer and is then cooled down and wound up for converting.

Prints made from this paper behind a translucent master in a diazotype printing machine and developed in a hot ammonia developing section of a commercial machine produced blackline copies of very close to neutral black and gray shades. Prints made from this paper behind a translucent master in a diazotype printing machine and developed in a cold ammonia developing section of a commercial machine produced print lines of uniform black and gray shades. The line color remained substantially uniform even when the ammonia concentrations in the developing machines were varied.

The sensitized paper of Example 1, exposed to a dry and hot (50% RH and 50° C.) atmosphere for 24 hours, developed to uniform shades which were substantially the same as the shades obtained from non-exposed paper. Print backgrounds with high brightness were obtained.

Similarly, the sensitized paper of Example 1, exposed to a moist and hot (75% RH and 50° C.) atmosphere for 24 hours, developed to shades which were substantially the same as the shades obtained from non-exposed paper. Print backgrounds with high brightness were obtained.

EXAMPLE 2

Direct process paper base was coated in a manner identical to Example 1 with the exception that in the diazo-type sensitizing solution the $N^I,N^{IV}$-dicyanoacet-triethylene tetramine, hydrochloride was replaced successively by:

(a) $N^I,N^{III}$-dicyanoacet-diethylene-triamine, hydrochloride;
(b) $N^I,N^V$-dicyanoacet-tetraethylene-pentamine, hydrochloride;
(c) 1-cyanoacet-4-beta-hydroxyethyl-piperazine;
(d) 1-cyanoacet-4-cyanoacet-aminoethyl-piperazine.

Prints made from paper coated with the diazo sensitizing solutions containing the cyanoacetylated polyamines of Examples 2 a, b, c and d), developed under the conditions of Example 1, produced prints close to neutral black shades on a white background. Also, the stability tests of the sensitized paper containing the cyanoacetylated polyamines of a, b, c and d of Example 2 exhibited substantially no precoupling and no color shift.

EXAMPLE 3

Direct process paper base was coated in a manner identical to Example 1 with the exception that the diazotype sensitizing solution was composed as follows:

| | |
|---|---|
| Water ml | 1,000 |
| Sulfosalicylic acid g | 10 |
| Citric acid g | 5 |
| Thiourea g | 30 |
| R-salt g | 15 |
| 2,7-dihydroxy-naphthalene - 3,6 - disulfonic acid, sodium salt g | 3.0 |
| $N^I,N^{IV}$-dicyanoacet-triethylene - tetramine, hydrochloride g | 15 |
| 1-diazo - 4 - dimethylamino-benzene, chloride, ½ zinc chloride g | 15 |
| Glycerine ml | 15 |
| Saponine g | 1 |
| Zinc chloride g | 60 |

Prints made from this paper behind a translucent master, developed in hot ammonia as well as in cold ammonia developing machines, produced close to neutral black shades on a white background.

The stability tests of the sensitized paper of Example 3 exhibited substantially no precoupling and no color shift when tested as in Example 1.

EXAMPLE 4

Transparentized 100% rag paper of a basis weight of 15 lbs. (weight of 500 sheets of 17" x 22") was coated in a manner identical to Example 1 with the exception that the diazo sensitizing solution was composed as follows:

| | |
|---|---|
| Water ml | 1,000 |
| Sulfosalicylic acid g | 20 |
| Citric acid g | 10 |
| $N^I,N^{IV}$-dicyanoacet-tetraethylene - pentamine, hydrochloride g | 40 |
| Thiourea g | 40 |
| 1-diazo-3-methyl - 4 - pyrrolidino-benzene chloride, ½ zinc chloride g | 30 |
| 1-diazo-4-dimethylamino - benzene, chloride, ½ zinc chloride g | 20 |
| Diethylene glycol ml | 20 |
| Foam powder g | 2 |
| Zinc chloride g | 30 |

Prints made from this paper behind a translucent master in diazotype printing machines, developed in hot ammonia as well as in cold ammonia developing machines, produced strong yellow lines on a colorless background. The yellow lines had an excellent opacity to ultraviolet light which makes their use very desirable as high quality second originals to make reprints therefrom on opaque diazotype material.

The shelf life of the sensitized paper of Example 4 when tested as in Example 1 induced substantially no precoupling and no color shift, and is superior to similar diazotype material in which conventional couplers, such as resorcinol or chlororesorcinol, were employed in place of the dicyanoacet-tetraethylene-pentamine coupler of Example 4.

EXAMPLE 5

To compare the improved results of employing cyanoacetylated polyamines of this invention with prior art couplers, direct process paper base was coated in a manner identical to Example 1 with the exception that in the diazo-type sensitizing solution the $N^I,N^{IV}$-dicyanoacettriethylene-tetramine, hydrochloride was replaced successively by:

(a) Acetoacetanilide
(b) Resorcinol
(c) m-Hydroxyphenylurea
(d) Cyanoacetamide
(e) Cyanoacet-beta-ethanolamide
(f) Cyanoacet-morpholide
(g) Cyanoacet-pyrrolidide Paper coated with the azo couplers identified above were subjected to accelerated aging tests of Example 1; condition #1 of 50° C. and 50% RH for 24 hours, and condition #2 of 50° C. and 75% RH for 24 hours.

Test (a) when subjected to condition #1 produced a diazotype print with strong yellow shades in half tones and with blue full tones. When subjected to condition #2 the test developed blue print lines with a strong yellow discolored background.

Test (c) when subjected to conditions #1 and #2 developed prints with pronounced blue shades in half tones to greenish shades in full tones.

Tests (b), (d), (e), (f) and (g) when subjected to condition #1 developed to blue tones indicating disappearance and migration of the yellow couplers.

To further demonstrate the stability of the cyanoacetylated polyamines, tests were conducted to determine the volatility and migratory characteristics thereof. A similar test is described in British specification No. 937,510. My test procedure employed herein was modified to conditions to which diazo reproduction materials are subjected in commercial manufacturing processes, which also take into account influence of water vapor and other ingredients of the sensitizing layer on the volatility of yellow couplers:

Direct process base paper is coated with standard diazotype sensitizing solutions which contain the diazocomponent and the usual stabilizers, humectants, nonvolatile blue coupler and a sufficient portion of yellow coupler to produce after development shades closest to neutral grays and black. The paper is coated and dried in a pilot coating machine equipped with a hot air high velocity convection dryer to a residual moisture of 3% to 3.5% by maintaining it in the dryer for 4 seconds and subjecting it to air blasts of 5,000 f.p.m. at a temperature of 200° F.

A portion of the paper is wrapped in black polyethylene foil and another portion is redried in the same dryer but for a period of 30 seconds. The redried portion is subjected to air blasts of 5,000 f.p.m. at a temperature of 250° F.

The portion of paper wrapped in black polyethylene foil and the redried paper were exposed behind a step wedge in a diazotype printing machine and developed in an ammonia atmosphere. The developed prints when compared exhibited shade differences and these differences are an indication of the volatility of the yellow coupler. Papers coated with volatile yellow couplers developed to shades with predominant blue tones for the redried samples. The shift to blue tones is proportional to the degree of volatility of the couplers. Papers coated with non-volatile yellow couplers produced identical shades on normally dried and redried samples because there is no loss of couplers through evaporation under exposure to the heat of the dryer. The test described above also permits the determination of whether the coupling component will precouple. Thus, the difference of the print background shade and brightness between two samples treated under the conditions described above will be an indication of the tendency of a specific coupling component to precouple. By employing the foregoing test procedure, a means is provided to select couplers for use in the manufacturing process which would provide consistent print shades independent of the drying conditions employed.

All test samples from Example 5 with exception of test (c) when subjected to redrying under the foregoing test procedure changed to pronounced blue shades upon development.

Samples of Examples 1–4 when subjected to redrying under the foregoing test procedure developed to uniform shades which were substantially identical to the non-redried sample.

The following examples illustrate a method for the preparation of the azo couplers of the invention herein:

EXAMPLE 6

Cyanoacet polyamine azo coupler, $N^I,N^{IV}$-dicyanoacet-triethylenetetramine, hydrochloride.

Two (2) mols (200 gms.) of cyanoacetmethyl ester are dissolved in 400 ml. of methanol. To this solution is added 1 mol (146 gms.) of triethylene tetramine. The mixture reacts spontaneously at room temperature and the reaction is exothermic. Copious crystallization of the azo coupler forms, precipitating from the mixture. After crystal formation is completed, the mixture is allowed to stand one hour. The crystalline product $N^I,N^{IV}$-dicyanoacet-triethylenetetramine, is filtered and is ready for use.

If desired the hydrochloride salt may be formed by adding the crystalline product to an alcoholic solution of hydrochloric acid. The hydrochloride salt crystallizes from soution and is recovered by filtration.

The $N^I,N^{III}$-dicyanoacet - diethylenetriamine, hydrochloride may be formed by following the procedure of Example 6. However, the amine component, triethylenetetramine, is replaced by an equivalent amount of diethylenetriamine. Similarly, the $N^I,N^V$-dicyanoacet-tetraethylenepentamine, hydrochloride is formed by replacing the amine component, triethylenetetramine, with an equivalent amount of tetraethylenepentamine; 1-cyanoacet-4-beta-hydroxyethylpiperazine is formed by replacing the triethylenetetramine with an equivalent amount of hydroxyethyl - piperazine; and 1-cyanoacet-4-cyanoacet-aminoethyl-piperazine is formed by replacing the triethylenetetramine with an equivalent amount of aminoethyl-piperazine.

The couplers of the invention herein may be employed economically for superfast printing blackline diazotypes, yellow line diazotypes for use as second originals, and for all other other diazotypes which require a yellow component. These couplers are substantially non-volatile and non-migratory and permit the manufacture of diazotypes with excellent shelf life. The diazo reproduction material may be processed for development under extreme temperature and humidity conditions.

The yellow couplers of the invention herein are also suitable for use in the manufacture of dyes for the textile, paper or other related industries where yellow azo dyes are applicable.

Thus, in accordance with the above description a new class of yellow azo couplers are described which are useful in the diazo reproduction industry as well as for dyes in other fields.

I claim:

1. A blackline diazotype reproduction composition which is adapted to be applied to a support sheet to form a diazo sensitized layer thereon, said composition comprising a diazonium compound, an acidic stabilizer, an azo coupling component for coupling with said diazonium component and $N^I,N^{IV}$-dicyanoacet-triethylenetetramine, for coupling with said diazonium component.

2. A blackline diazotype reproduction composition which is adapted to be applied to a support sheet to form a diazo sensitized layer thereon said composition comprising a diazonium compound, an acidic stabilizer, a blue azo coupling component for coupling with said diazonium component and $N^I,N^V$-dicyanoacet-tetraethylenepentamine, for coupling with said diazonium component.

(References on following page)

References Cited

UNITED STATES PATENTS

| | | | |
|---|---|---|---|
| 2,537,106 | 1/1951 | Von Glahn et al. | 96—91 |
| 2,537,001 | 1/1951 | Von Glahn et al. | 96—91 |
| 2,531,004 | 11/1950 | Slifkin | 96—91 X |
| 1,989,065 | 1/1935 | Schmidt et al. | 96—91 X |
| 2,552,355 | 5/1951 | Von Glahn et al. | 96—91 |
| 3,248,220 | 4/1966 | Van Rhijn | 96—91 |
| 3,387,977 | 6/1968 | Habib et al. | 96—91 |
| 2,537,919 | 1/1951 | Slifkin | 96—91 |
| 3,615,575 | 7/1968 | Rauhut | 96—49 |

FOREIGN PATENTS

| | | | |
|---|---|---|---|
| 937,510 | 9/1963 | Great Britain | 96—91 |

OTHER REFERENCES

Rauhut, H., S. African Pat. 68/4,932, Jan. 21, 1969 (Chem. Ab., vol. 72, 17282C and Rep. of S. Africa Patent Journal, vol. 2, No. 2, p. 203).

Kosar, J., "Light-Sensitive Systems," Wiley & Sons, 1965, pp. 241–244.

Dinaburg, M. S., "Photosensitive Diazo Cpds.," Focal Press, 1965, pp. 106–109, 115 and 116.

CHARLES L. BOWERS, JR., Primary Examiner

U.S. Cl. X.R.

96—49; 260—89.7, 268, 563